(12) United States Patent
Magocs et al.

(10) Patent No.: US 6,844,981 B2
(45) Date of Patent: Jan. 18, 2005

(54) NON-SYMMETRICAL LIGHT STOP

(75) Inventors: Stephen Magocs, Knoxville, TN (US);
Gregory W. Keck, Knoxville, TN (US);
Michael B. Larson, Georgetown, OH (US); Carl J. Gilman, Florence, KY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/254,226

(22) Filed: Sep. 25, 2002

(65) Prior Publication Data
US 2004/0057123 A1 Mar. 25, 2004

(51) Int. Cl.⁷ .............................. G02B 3/00; G02B 9/00; G02B 9/08
(52) U.S. Cl. ..................................... 359/649; 359/738
(58) Field of Search ................................ 359/649–651, 359/738–740, 741

(56) References Cited

U.S. PATENT DOCUMENTS

| | | | | |
|---|---|---|---|---|
| 4,989,960 A | * | 2/1991 | Thomas | 359/738 |
| 5,274,480 A | | 12/1993 | Hirai et al. | 359/40 |
| 5,371,559 A | | 12/1994 | San-Nohe et al. | 353/31 |
| 5,607,216 A | * | 3/1997 | Kaneko et al. | 353/97 |
| 5,662,401 A | | 9/1997 | Shimizu et al. | 353/38 |
| 6,104,545 A | * | 8/2000 | Tsuchida | 359/654 |
| 6,634,756 B1 | * | 10/2003 | Shimizu | 353/74 |
| 6,637,894 B2 | * | 10/2003 | Dewald et al. | 353/97 |
| 2002/0051094 A1 | | 5/2002 | Makita | 348/744 |

* cited by examiner

Primary Examiner—Jordan M. Schwartz

(57) ABSTRACT

In a projection display system for example, a projection lens includes a non-radially symmetrical light stopped that is painted or otherwise applied directly to the surface of an optical lens element of the projection lines.

6 Claims, 3 Drawing Sheets

NON-SYMMETRICAL LIGHT STOP

FIELD OF TECHNOLOGY

The invention relates to projection lenses, and more particularly to projection lenses for compact rear-projection displays.

BACKGROUND AND SUMMARY

Rear screen projection television displays have found great consumer interest due to a large image size. A primary disadvantage is the set volume and depth. For this reason manufacturers are always looking for ways to reduce size, for example by folding the optical path and also by making component parts smaller. This makes exact placement and alignment of the various components very important.

Light production is also very critical in projection displays. A projection lens, which generally comprises a number of optical elements such as individual lenses, generally projects the image to a viewing screen. A small misalignment of components in the projection lens, for example a misalignment of the light stop within the projection lens with respect to the optical axis of the projection lens, can cause a disadvantageous decrease in efficiency and a reduction in usable light for projecting the image. Such a misalignment can also of course introduce aberrations to the produced image.

Conventional projection lenses generally use an external lens stop or other separate light stop element within it to reduce glare and/or aberrations for example from non-desired portions of the image/light beam. This is fine for most projection lens applications, but in the most light-efficient projection display systems very small misalignments of the light stop can cause problems, and these very small misalignments of the light stop with respect to the other lenses of the projection lens can occur.

It is advantageous therefore to find ways to reduce the likelihood that the light stop used in a projection lens can get out of alignment.

Accordingly, in a first aspect of the invention, a projection lens includes at least one optical lens element and a non-radially symmetrical light stop applied directly to a surface of the optical lens element.

In a second aspect of the invention, a projection display system includes a light engine, a projection lens disposed to receive an image, and a projection screen disposed to receive the image.

In a third aspect of the invention, a method for aberration selectively blocking light in a projection display system includes projecting an image through a projection lens that includes an optical lens element and applying a non-radially symmetrical light stop directly to a surface of the optical lens element.

BRIEF DESCRIPTION OF THE DRAWING FIGURES

The invention may be understood with reference to the following drawing figures, whose dimensions, positions, angles, etc. are not necessarily drawn to scale, and in which.

DETAILED DESCRIPTION

The figures in this detailed description are meant to illustrate representative embodiments for the purpose of explaining the invention, and should not be construed to limit the claims to specific embodiments.

Figure 1:
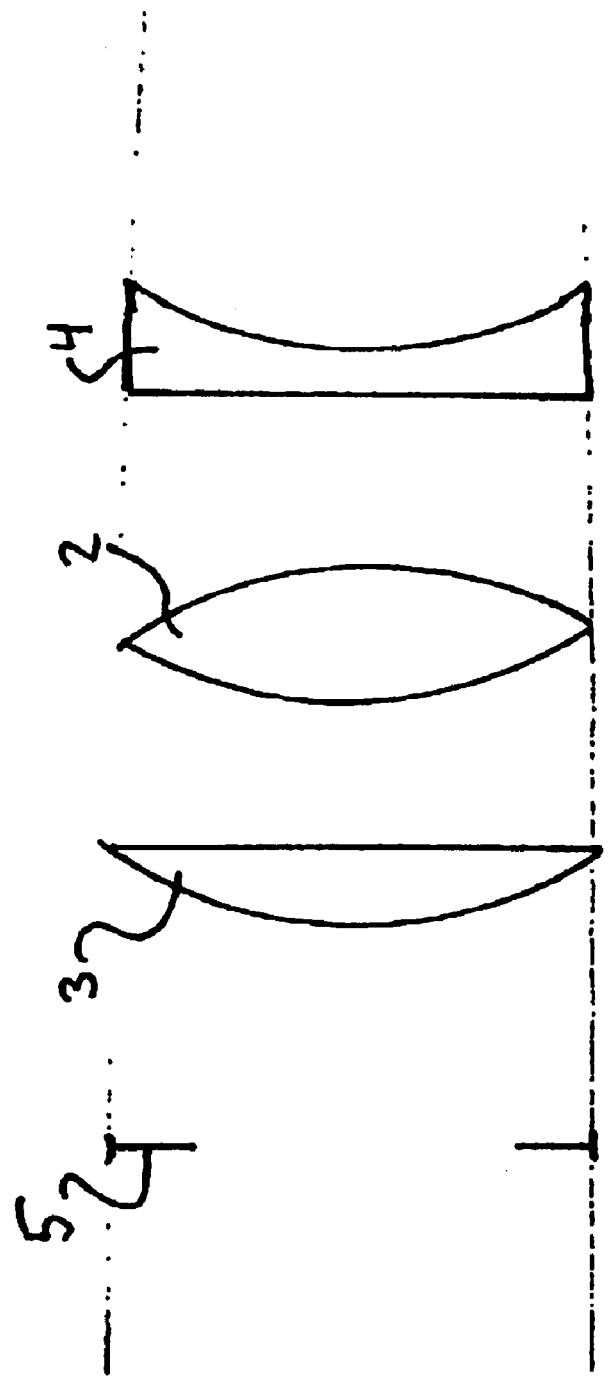
FIG. 1 is a simplified diagram representative of a projection lens cross-section.

FIG. 1 is a very simplified diagram representing a conventional projection lens 1 cross-section. A typical projection lens can include a large number of individual lens elements; for simplicity this figure shows only three optical lens elements 2, 3, 4 and a lens stop 5. Light from the image generally passes through the optical lens elements 2, 3, 4 and the lens stop 5.

Figure 2:
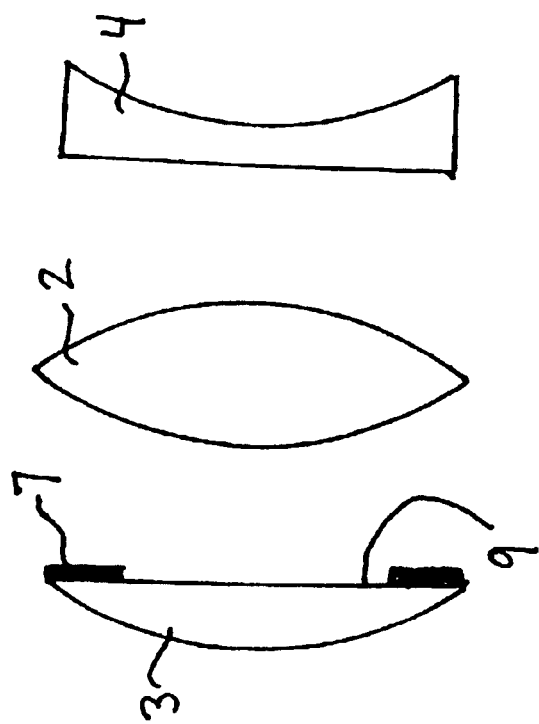
FIG. 2 is a simplified diagram representative of a projection lens cross-section with a light stop applied directly to an optical lens element according to the invention.
Figure 3:
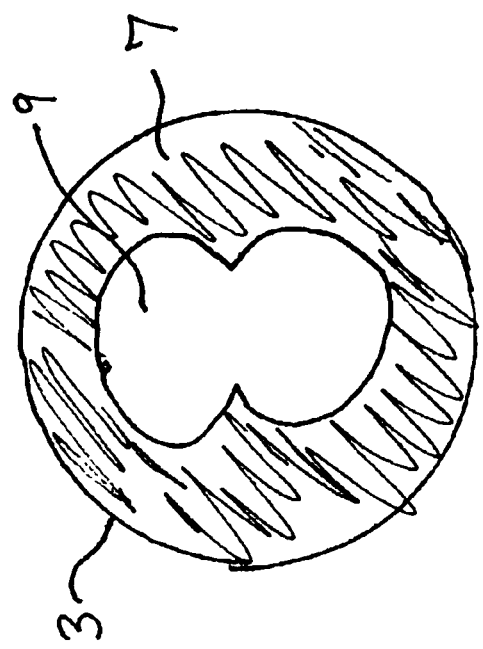
FIG. 3 is a simplified drawing of an optical lens element shown from one end, showing an example of a non-radially symmetrical shape for the light stop according to the invention.

FIGS. 2 and 3 illustrate how a projection lens 1 can be modified according to the invention by painting or otherwise applying a lens stop 7 with a non-radially symmetrical shape, for example by painting, directly to a surface 9 of one of the optical lens elements 3. The shape will be non-radially symmetrical in order to work better with and provide better efficiency for projection display systems that have non-circular optical aspects, and/or to correct for optical aberrations. An asymmetric aperture can compensate for coma of the collector mirror in a light engine for example. Furthermore, the preferred shape of the lens stop 7 is non-symmetrical for use with off-axis projection to better conform to a preferred geometry for reducing cabinet size. The exact non-radially symmetrical shape can be determined by ray tracing the image back through the optical system to the lens element 3. Of course, the shape can be non-symmetrical in other ways as well, aside from being merely non-radially symmetrical.

Figure 4:
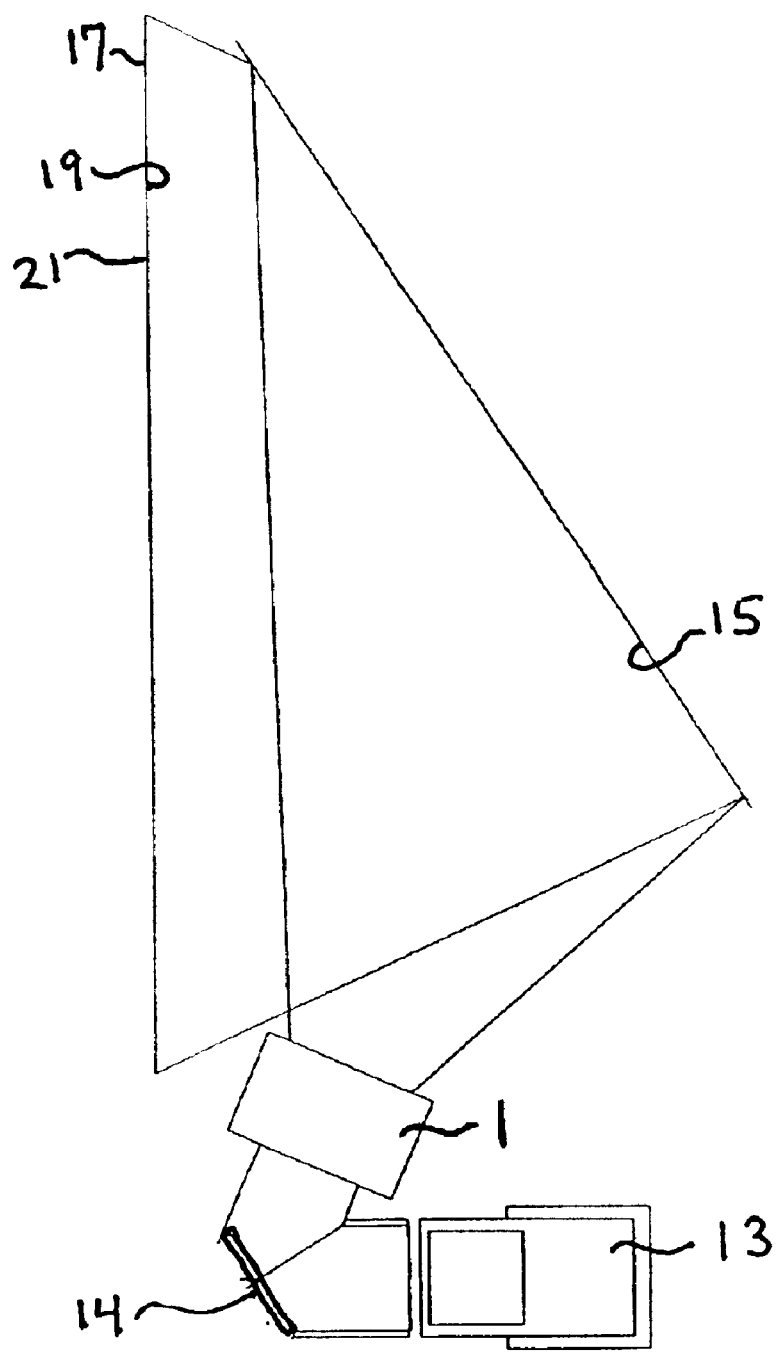
FIG. 4 is a simplified diagram representative of a rear-projection display system that can incorporate a non-radially symmetrical light stop according to the invention.

FIG. 4 illustrates an example of an embodiment of a rear-projection display system utilizing the invention. A light engine 13 directs light onto an image-forming liquid crystal on silicon (LCoS) panel 14 for example for producing an image. The image is received by and passes through the projection lens 1 with the non-radially symmetrical light stop 7 (not visible in FIG. 4), and is reflected from a fold mirror 15 onto a rear surface 19 of a viewing screen 17. The viewer of deserves the image from the front surface 21 of the viewing screen 17. The exact non-radially symmetrical shape shown is only an example, and is exaggerated to more clearly see the non-symmetrical nature of the shape. The exact preferred shape will depend on the light path of the projection system, and can be determined by ray tracing as mentioned above.

Other embodiments, variations of embodiments, and equivalents, as well as other aspects, objects, and advantages of the invention, will be apparent to those skilled in the art and can be obtained from a study of the drawings, the disclosure, and the appended claims.

We claim:

1. A method for aberration selectively blocking light in a projection display system, comprising:

projecting an image through a projection lens that includes an optical lens element;

applying a non-radially symmetrical light stop having a non-radially symmetrical shape directly to a surface of the optical lens element; and ray tracing a desired image beam shape to determine the non-radially symmetrical shape of the lens stop.

2. The method of claim 1, wherein the non-radially symmetrical light stop is applied by painting the non-radially symmetrical light stop to the surface of the optical lens element.

3. The method of claim 1, comprising reflecting the image from a mirror onto a viewing screen.

4. The method of claim 3, wherein the image is reflected onto the viewing screen from behind its viewing surface.

5. The method of claim 2, comprising reflecting the image from a mirror onto a viewing screen.

6. The method of claim 5, wherein the image is reflected onto the viewing screen from behind its viewing surface.

* * * * *